(12) United States Patent
Rodkey et al.

(10) Patent No.: US 7,684,548 B1
(45) Date of Patent: *Mar. 23, 2010

(54) NOTIFICATION AND RESPONSE SYSTEM WITH ATTENDANCE TRACKING FEATURES

(75) Inventors: Ryan Scott Rodkey, Sugar Land, TX (US); John Frank Rodkey, Jr., Missouri City, TX (US); David Lynn Hickey, Rosharon, TX (US); Darren Lynn Ross, Sugar Land, TX (US)

(73) Assignee: Techradium, Inc., Sugar Land, TX (US)

( * ) Notice: Subject to any disclaimer, the term of this patent is extended or adjusted under 35 U.S.C. 154(b) by 921 days.

This patent is subject to a terminal disclaimer.

(21) Appl. No.: 11/486,611

(22) Filed: Jul. 14, 2006

Related U.S. Application Data

(63) Continuation-in-part of application No. 11/132,542, filed on May 19, 2005, now Pat. No. 7,174,005, which is a continuation-in-part of application No. 11/117,594, filed on Apr. 28, 2005, now Pat. No. 7,130,389.

(51) Int. Cl.
*H04M 1/64* (2006.01)

(52) U.S. Cl. .................. 379/88.12; 379/40; 379/88.13; 379/88.16; 379/221.11; 455/414.2; 702/3; 707/102; 709/206; 709/230; 714/39; 715/234

(58) Field of Classification Search .................. 379/79, 379/88.12, 88.23, 252, 40, 88.13, 88.16, 379/221.11; 455/414.2; 702/3; 707/102; 709/206, 230; 714/39; 715/234
See application file for complete search history.

(56) References Cited

U.S. PATENT DOCUMENTS

| | | | |
|---|---|---|---|
| 5,694,019 A | 12/1997 | Uchida et al. | |
| 6,404,880 B1 | 6/2002 | Stevens | |
| 6,442,241 B1 | 8/2002 | Tsumpes | |
| 6,463,462 B1 | 10/2002 | Smith | ......................... 709/206 |
| 6,496,568 B1 * | 12/2002 | Nelson | .................... 379/88.12 |
| 6,643,355 B1 | 11/2003 | Tsumpes | |
| 6,678,358 B2 | 1/2004 | Langsenkamp et al. | |
| 6,683,870 B1 | 1/2004 | Archer | |
| 6,697,477 B2 | 2/2004 | Fleischer | ................ 379/211.02 |
| 6,816,878 B1 | 11/2004 | Zimmers et al. | |
| 6,842,772 B1 | 1/2005 | Delaney et al. | |
| 6,871,214 B2 * | 3/2005 | Parsons et al. | .............. 709/206 |
| 6,912,691 B1 * | 6/2005 | Dodrill et al. | ................ 715/234 |
| 6,920,204 B1 * | 7/2005 | Tuttle | ...................... 379/88.16 |
| 6,931,415 B2 * | 8/2005 | Nagahara | .................... 707/102 |
| 6,970,535 B2 | 11/2005 | Gregory et al. | |

(Continued)

*Primary Examiner*—Gerald Gauthier
(74) *Attorney, Agent, or Firm*—Buskop Law Group, PC; Wendy Buskop

(57) ABSTRACT

A notification and response system utilizes an administrator interface to transmit an attendance messages from an administrator to a contact devices for guardians, employees, and students associated with an institution. The system comprises a dynamic information database that includes guardian, employee and student contact data, priority information, and response data. The administrator initiates distribution of the attendance message based upon grouping information, priority information, and the priority order. The message is transmitted through at least two industry standard protocol simultaneously to groups of guardian, employee, and student contact devices based upon priority information. Once the attendance message is received by the guardian, employee, or student contact devices, the guardian, employee, and student contact devices transmit a response through the industry standard protocol back to the dynamic information database.

25 Claims, 4 Drawing Sheets

U.S. PATENT DOCUMENTS

| | | |
|---|---|---|
| 6,973,166 B1 | 12/2005 | Tsumpes |
| 6,999,565 B1 | 2/2006 | Delaney et al. |
| 7,069,303 B2 | 6/2006 | Sikora et al. |
| 7,139,664 B2 * | 11/2006 | Kelly et al. .................... 702/3 |
| 7,184,521 B2 | 2/2007 | Sikora et al. |
| 7,353,256 B2 | 4/2008 | Delaney et al. |
| 7,401,147 B2 | 7/2008 | Sikora et al. |
| 7,409,428 B1 | 8/2008 | Brabec et al. |
| 7,526,563 B2 * | 4/2009 | Ingimundarson et al. .... 709/230 |
| 7,609,819 B1 * | 10/2009 | Tuttle ........................ 379/40 |
| 2002/0032020 A1 * | 3/2002 | Brown et al. ................ 455/414 |
| 2002/0049930 A1 * | 4/2002 | Hannigan .................... 714/39 |
| 2002/0095414 A1 | 7/2002 | Barnett et al. |
| 2002/0156759 A1 | 10/2002 | Santos |
| 2003/0186716 A1 | 10/2003 | Dorenbosch et al. |
| 2005/0013417 A1 | 1/2005 | Zimmers et al. |
| 2008/0143548 A1 | 6/2008 | Grimmelmann et al. |
| 2008/0263169 A1 * | 10/2008 | Brabec et al. ............... 709/206 |
| 2009/0077045 A1 | 3/2009 | Kirchmeier et al. |
| 2009/0131088 A1 | 5/2009 | Kirchmeier et al. |
| 2009/0135008 A1 | 5/2009 | Kirchmeier et al. |
| 2009/0156240 A1 | 6/2009 | Kirchmeier et al. |

* cited by examiner

NOTIFICATION AND RESPONSE SYSTEM WITH ATTENDANCE TRACKING FEATURES

CROSS REFERENCE TO RELATED APPLICATIONS

The present application is a Continuation-in-Part to U.S. patent application Ser. No. 11/132,542; Entitled "School-Wide Notification and Response System," filed on May 19, 2005, now issued as U.S. Pat. No. 7,174,005 which claims priority from co-pending U.S. patent application Ser. No. 11/117,594; Entitled "Digital Notification and Response System," filed on Apr. 28, 2005.

FIELD

The present embodiments relate generally to the creation and delivery of messages, to the routing, and to the verification and collection of responses to the messages to guardians, employees, and students associated with an institution, such as a school or a school system. The system and methods are universally applicable to, and independent of, the type of messaging system and device selected by the message recipients.

More particularly, the present embodiments relate to an immediate response information or emergency system for guardians, employees, and students associated with an institution, such as a school or a school system relating to student daily attendance which can relate to tracking attendance of a child in case of an emergency situation or knowing where the child is while in an institution or school system.

BACKGROUND

Institutions, such as schools or school systems, need a system to send and receive information using a variety of messaging formats, systems, and message receiving devices. Often the messages will vary in their level of importance. This could affect the delivery methods and/or the nature and timing of any needed response to the message. For example, the arrival of an e-mail message from a particular sender might cause the recipient to fax a report in response. In some group messaging contexts, the post-message processing, organizing, and reporting of multiple message responses can be important in further decision making by the message originator.

The prior art methods implemented in commercially available unified messaging and device specific systems generally provide one-way delivery, with destinations defined by the sender. Unfortunately, prior art systems do not solve the need for originating a message, with attachment and response requirements, in a manner and format that is independent of the type of the device that is to be used for delivering the message to the recipients, particularly when there is danger to a student due to not showing up for school which could be a signal of a kidnapping or a runaway situation.

Also, prior art systems do not permit the message notification methods to be defined by the recipients, and do not include a facility for automatic processing and organization of message responses. Accordingly, known e-mail, unified messaging and specific device systems using these prior art methods are deficient in responding to these requirements.

A need exists for a system and method for automating and escalating the delivery of messages and collection of message responses implemented through messaging devices of multiple types particularly with regards to attendance of a student The system needs to work in conjunction with recipient rules routing, verification of notification and response, and collection of responses in a predefined format.

A need exists for a method of communication from an administrator which reaches all possible forms of communication devices, so that all members of the designated user groups can be reached.

A need exists for a system that can transmit a message in multiple languages to multiple user devices to inform the public of emergency situations, and general information simultaneously.

The present embodiments meet these needs.

BRIEF DESCRIPTION OF THE DRAWINGS

The detailed description will be better understood in conjunction with the accompanying drawings as follows.

Figure 1:
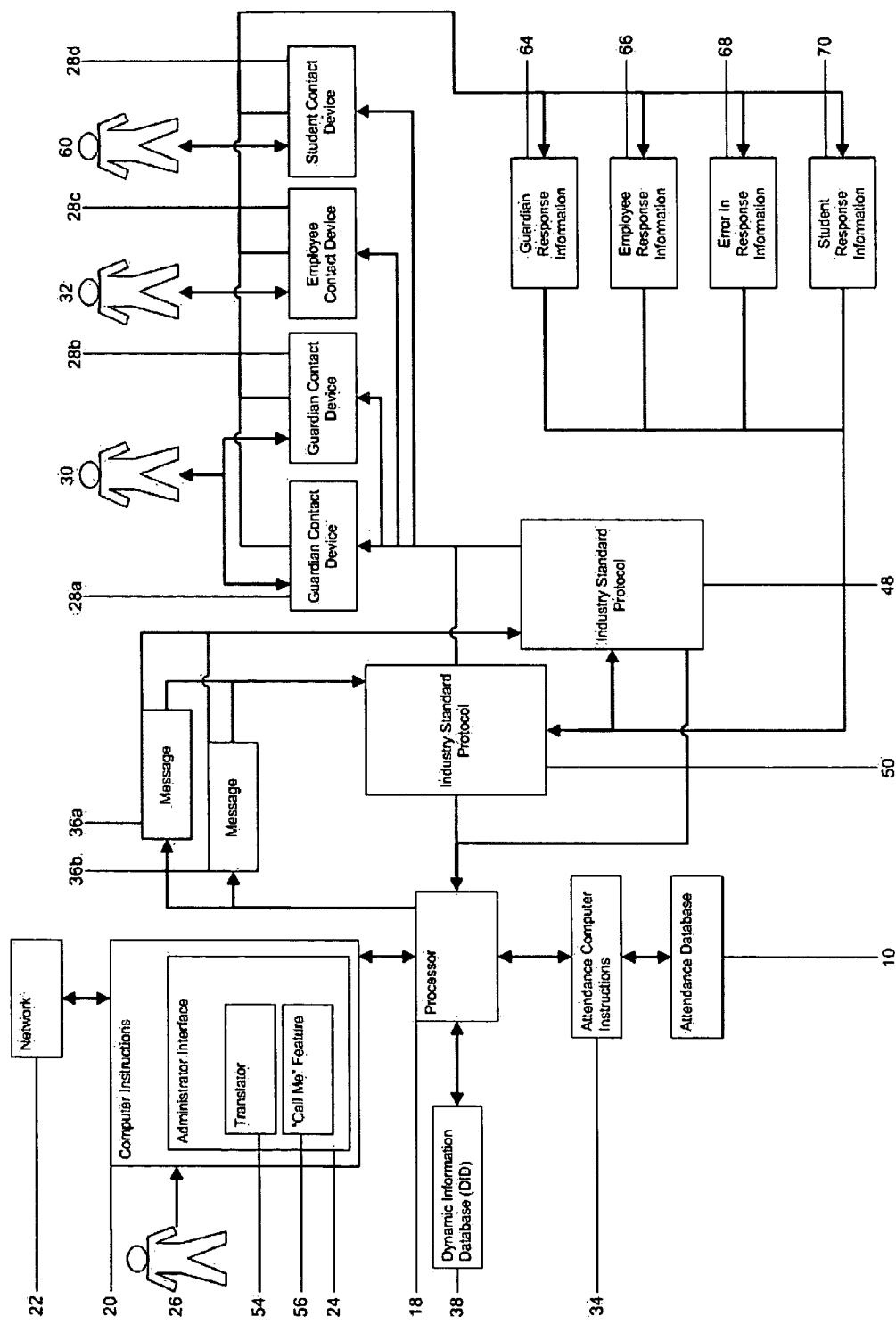
FIG. 1 depicts a representation of an embodiment of a digital notification and response system for handling attendance.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that the invention can be practiced or carried out in various ways.

The present embodiments relate to an immediate response information or emergency system for a institution school or school system. An institution can be an established organization or foundation, especially one dedicated but not limited to education, public service, or hospitality. The embodied methods provide better communication with guardians, employees, and students other than using a conventional telephone.

The embodied methods provide a communication system that ensures guardians, employees, and students of a school are contacted simultaneously to a chosen first user device, such as an email, or a cellular phone, or a Blackberry™ when an attendance problem has occurred.

The present embodiments relate to a system that can be used for both emergency use and for improved communication between guardians, employees, and students associated in a institution, such as a school or a school wide system.

For example, the system can be used to notify a guardian or parent when a child is missing from school. The systems can be used to advise guardians or parents of PTA meetings, sports events, early dismissals and school closures, in which a student might be reluctant to tell their guardians or parents.

The embodied methods can be used to contact school board members concerning attendance in the school and other safety issues that may be present in the institution.

These present embodiments are designed to save lives, prevent kidnapping and terroristical acts, and other harmful situations.

The embodied methods provide a manner for the information to be transmitted to guardians, employees, and students in "real time" or nearly immediately. The system is designed to be operational throughout the school year.

The system can maintain a current database of contact information for guardians, employees, and students. In the context of the present application, the term "guardians" refers to one who is legally responsible for the care and management of a person or property of an incompetent, minor, or student in the institution to which this system applies.

With the scope of this application, the term "employee" refers to teachers and other faculty, coaches, contractors to the institution, principals, secretaries, superintendents, consultants to the institutions, school board members, coordinators, security personnel, emergency personnel, counselors, maintenance personnel, and other individuals that work on the facility, in the facility, or in conjunction with school activities.

The present embodiments relate to the creation and delivery of messages, and to the routing, and to the verification and collection of responses to the messages to guardians, employees, and students of a institution or a school system. The system and methods are universally applicable to, and independent of, the type of messaging system and device selected by the message recipients. The present embodiment relates to the simultaneous transmission of a message in multiple languages to a user device, wherein the recipient of the message selects the language for transmission to the recipient.

The embodied immediate response information system provides a timely and uniform manner to contact numerous users through numerous user contact devices, such as a cell phone, a television, a light emitting diode "LED" display, a land phone line, an e-mail address, a fax machine, a pager, a digital display, similar devices, and handheld wireless device, including personal digital assistants "PDA's" and a Blackberry™.

The system is used to contact guardians, students, and employees in the case of emergency conditions, such as storms, flooding, and fire; and in the case of informational situations, such as school closings, early releases, and terroristical situations.

The present embodiments provide a system that has a high speed notification and response system in which information is accessed and stored in a dynamic information database (DID). The systems can be set to contact guardians, employees, and students automatically when specific conditions arise or to contact guardians and employees when initiated by an administrator. The administrator can be a person, a computer, an analog emergency notification system, an additional digital notification and response system, or combinations of these entities. The systems can be set to contact a large number of guardians and employees in a systematic manner based upon priority.

The present embodiments can be used to save lives because the system can notify large groups of individuals concerning very dangerous situations quickly to many different devices. The system can be used to update users that a situation is safe. This system stops panic and chaos, because the system can send a consistent message to all guardians and employees on the system.

The embodied immediate response information systems provide other benefits, such as general information update, which are not emergency situations. For example, a message can be sent such as "bring a flower to your teacher tomorrow because it is her birthday" to all guardians or students in a second grade class using the system.

As an example, an embodiment of the system can be utilized as follows: A principal of a high school, in this example the administrator, wants to send a message to all guardians or parents of students and employees associated with the school.

The principal goes to his computer, goes to the web browser, and clicks on the site that contains the administrator interface, such as "irisdispatch.com".

The site is the administrator interface used to transmit the message to the guardians, employees, and students via a contact device.

Once the web interface comes up, the principal enters the site using with a user name and a password, such as, user name Jerry Spears, password: 123jsp. The principal types in the message, "A chemical leak has occurred at a nearby chemical plant. We are canceling school and urge all students, parents and employees of Dobie High School to stay indoors. All outside activities are cancelled."

Once the message is entered, the principal presses the send button. The system proceeds automatically to do the following:

a. The system identifies that the employees of Dobie High School are the first priority group for this type of message. The system transmits the message to each employee's contact device based upon the contact information in the database.
b. The system identifies that the guardians and parents of Dobie High School students are the second priority group for this type of message. Likewise, system transmits the message to each parent's contact device based upon the contact information in the database.
c. The system continues to contact groups based upon priority groupings for this type of message.
d. Each contact device returns a response that the information has been received.

The database stores the information into a database for report generation on demand.

e. The system continues to transmit the message to contact devices that have not responded until all contact devices have received the message or until the principal ends the transmission.

As a second example, an embodiment of the system can be utilized as follows: At a high school, a student appears in a classroom with a handgun and seems to be threatening other students.

An employee sees the behavior and runs to the administrator interface console in the school. In this example, the administrator interface console is a dedicated computer with an icon that allows for quick access to the administrator interface.

An employee accesses the interface with a user name and password, and selects a predefined message from the initial page of the web interface.

In this case, the teacher sends the following message: "Need Police Assistance at Clearwater High immediately" and, then, adds a custom message: "Student with Gun in Room 22." The message is transmitted to priority groups based upon priority order. In this case, the police department receives the message first since the police are recognized by the system as the first priority group for this type of message.

The system then proceeds like the first example in contacting all devices and collecting all responses.

With reference to the figures, FIG. 1 shows an example of an embodiment of the digital notification and response system. An administrator interface (24) can transmit one or more messages (36a and 36b) from an administrator (26) to at least one or more guardian contact devices or at least one student contact device and at least one employee contact devices (28a, 28b, 28c, and 28d).

FIG. 1 represents an embodiment, wherein the guardian (30) has two contact devices that are notified (28a and 28b), the employee (32) has one employee contact device that is notified (28c) and the student (60) has one student contact device that is notified (28d). Each guardian contact device corresponds to a guardian or parent of a child in a school, each employee contact device corresponds to an employee of the school, and each student contact device corresponds to a student in the school. For example, student Betty has a student user device or cell phone, her mother Joan has a pager, her Dad, Bill has a Laptop, and her teacher, Miss Rosa, has a Blackberry™.

An additional embodiment contemplates that administrator interface has several features, a call me feature (56) enabling an administrator to record a message for delivery.

Figure 2:
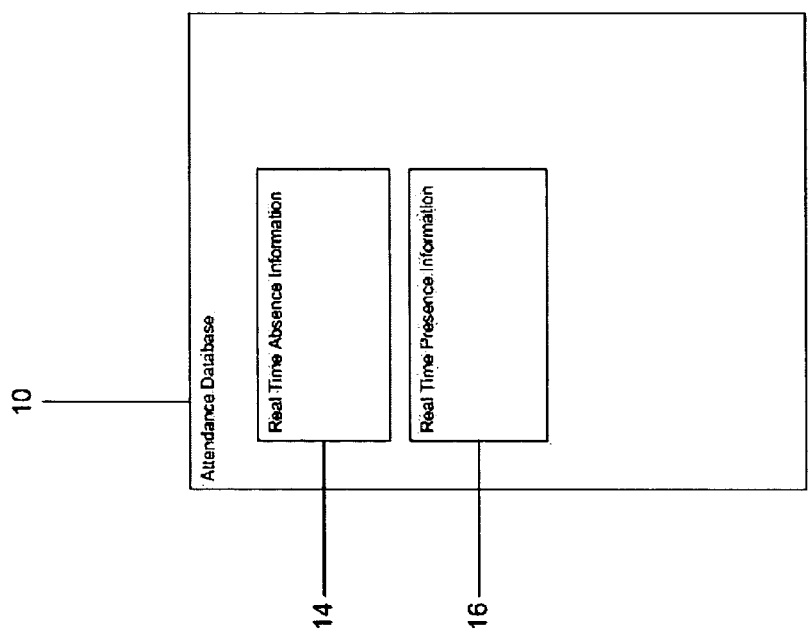
FIG. 2 depicts a representation of embodiment of a attendance database associated with a digital notification and response system.

An attendance feature as shown in FIG. 2, it includes a database (10) which includes real time absence information (14) on daily absence, or a student failing to be present in a class, a school or school system, and real time presence information (16) concerning the presence of students in a school or school system, which is ascertained from a scanned or entered student identification number into a database of the school. Each student in this method is contemplated to have a student identification number.

The real time absence information is the actual time in which a person is declared absent either from an institution, such as a school, a class, or a school wide system.

The real time presence information is the actual time in which a person is declared present and where or not that person is tardy from an institution, such as a school, a class, or a school wide system.

Returning to FIG. 1, the administrator interface (24) communicates with the processor (18) and the dynamic information database (38) using computer instructions (20). The administrator interface (24) has a "call me" feature (56) which is a control device, that enables an administrator, guardian, employee, or student to call into the system and communicate via the administrator interface (24). As part of the administrator interface (24), a translator (54) exists, either at the institution or electronically to record messages in real time with user selected languages. The administrator interface (24) can use the call me feature (56) enabling a administrator (26) to record a message for delivery to the appropriate contact devices.

The administrator interface (24) can be a local area network interface, a wide area network interface, a virtual private network interface, asynchronous transfer mode interface, synchronous optical network interface, a call center, a voice mail, or other similar means to transmit a message to numerous contacts.

In this embodiment, as shown in FIG. 1, the administrator interface includes a "call me" feature (56) enabling an administrator to record a message for delivery and an attendance tracking feature for tracking individual students whereabouts, whether present, absent, or tardy in the institution, such as a school or to a class. The attendance tracking feature can include an attendance database (10), which comprises files with real time absence information and real time presence information. Specifically, the embodiment includes a processor (18) with computer instructions (34) to instruct a processor (18) to pull data from the attendance database (10), when an individual student needs to be located.

The computer instructions (34) instruct a processor (18) to communicate with a guardian contact device (28a and 28b) or employee contact device (28c) if a student is missing, tardy or absent. The computer instructions (34) further instruct a processor (18) to further contact an additional guardian contact device (28a and 28b) where there is no response to the communication with a first guardian contact device, and the computer instructions can store responses from the guardian contact devices or the employee contact device.

In this embodiment the administrator can initiate distribution of the attendance message using the guardian data, employee data, and student data, and grouping information, wherein the message is transmitted through at least two industry standard protocols simultaneously, and the message is received by at least one guardian contact device, and at least one employee contact device, and/or at least one student contact device, and wherein at least one guardian contact device, at least one employee contact device, and/or at least one student contact device transmits a response through the industry standard gateways to the dynamic information database.

The message can be a text message, a numerical message, one or more images, or a combination of these. The message can be encoded. The message can include a designation that identifies the importance the message. Examples of these designations include low priority, general priority, significant priority, high priority, and severe priority.

The designations can be color-coded, such as green for a low priority message, blue for a preparedness message or general priority message, yellow for a cautionary message such as a significant priority, orange for an emergency message or high priority message, or red for a critical message with a severe priority. These priority levels can be customized and tailored to standards for a particular institution, such as a school or school system. The messages and priority codes can be prewritten and stored in the dynamic information database for subsequent use of the administrator.

As seen in FIG. 1, the message (6a and 6b) is transmitted to one or more guardian and employee contact devices (28a, 28b, and 28c), and a student contact device (28d). There can be additional student contact devices for students, such as an older sister or brother who is required to take care of a younger child.

Examples of usable contact devices include handheld wireless devices, wireless phones, land phones, e-mail addresses, digital displays, and light emitting diode "LED" display, fax machines, pagers, and similar devices that capable of receiving a message. An example of a handheld device includes a PDA, a Blackberry™, or a cellular phone.

The message (6a and 6b) is stored on a dynamic information database (38) which is adapted to store attendance data and messages relative to attendance at a location remote to the institution.

The message can be a prewritten message stored in the dynamic information database for subsequent use by the administrator or can be generated from the dynamic information database based upon inputs from the administrator and transmitted using the administrator interface.

Figure 3:
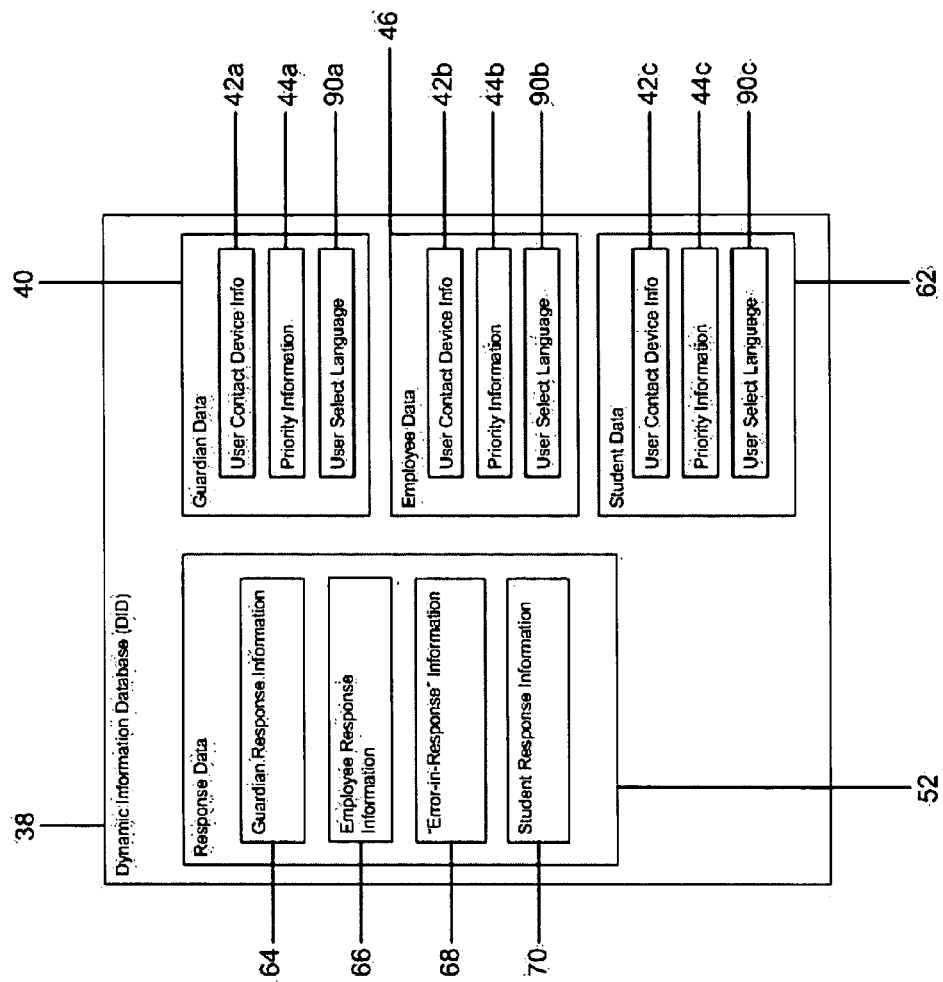
FIG. 3 depicts a representation of an embodiment of a dynamic information database associated with a digital notification and response system.

FIG. 3 shows a schematic of the dynamic information database (38). The dynamic information database (38) includes four sections: guardian data (40), employee data (46), student data (62), and response data (52).

The dynamic information database (38) can be an SQL™ database, MYSQL™ database or other industry standard databases, an Oracle™ database, combinations of these databases, or other similar databases that can organize information in a similar manner.

The dynamic information database (38) includes guardian data (40), that includes user contact device information (42a), and priority information (44a) that indicates a contact order for the guardian contact devices, employee data (45) that includes user contact device information (42b) and priority information (44b) that indicates a contact order for the employee contact device, and student data (62), that includes user contact device information (42*c*) and priority information (44*c*) that indicates a contact order for the student contact device.

A user selected language can be indicated for the message (36*a* and 36*b*). The contact data (14) includes information related with the guardian and/or employee associated of the user contact device.

A user, wherein at least one person enrolled in an institution has a personal identification code "PIC" which corresponds to a bar bard, a radio frequency identification device "RFID" tag, a scannable badge, a smart card, security token, a biometric file, and combinations thereof.

An additional embodiment can include an interactive voice response "IVR". In this embodiment a IVR can be a computerized system that allows a person, such as a telephone caller, to select an option from a voice menu and otherwise interface with the computer system.

A user, within the scope of this application, is a person that can receive a message, send a message, respond to a message, or combinations thereof. Examples of users can include an individual, a guardian of a child, a security company, a school board member, a firefighter, combinations of these, or the like.

The contact device information (42*a*, 42*b*, and 42*c*) can include an e-mail address, an internet protocol (IP) address, a phone number, a pager number, and combinations thereof. The contact device information (42*a*, 42*b*, and 42*c*) can further include a name, an address, a phone number, a device address, a social security number, an account code, and combinations thereof. Each contact device can include information that is unique to each individual guardian, employee and/or student contact devices or can include information that is common to all contact devices. For example, a serial number for a cell phone, a Mac™ address for an Ethernet card.

The contact data (40, 45, and 62) includes priority information (44*a*, 44*b* and 44*c*). The priority information is used to indicate a contact order for various contact devices of the guardians, employees, and students. The contact order is used to direct the order in which the dynamic information database transmits a message to the contact devices (28*a*, 28*b* and 28*c*) which can include student contact devices (28*d*).

The contact data (40, 45, and 62) can include information beyond the examples listed in order to aid the dynamic information database in contacting the user contact devices. For example, Mrs. Smith has a phone extension of 1234 in addition to her phone number.

The contact data can include priority order, which provides the benefit of ensuring that the most critical guardians, employees, and students receive the message first in case time is not available to contact all of the users. The priority order also provides the benefit that all parents employees, and students get contacted with equal priority, rather than a discriminating message delivery priority. The priority order guarantees that all users get contacted to on a preferred device first.

The grouping information can include one or more groups associated with the contact data. By grouping guardians and employees, the system provides the benefit of more efficient delivery of information without having to treat each user individually. Group more efficiently defined message recipients speeds the delivery of the message.

The grouping information can further include a predefined group identified in the dynamic information database. The predefined group can be identified by the administrator or by another user in advance to sending the message. Examples of groupings include guardians of a second grade class, an alumni class from a specific year, hazmat response teams, janitors, superintendents, school board members, teachers, and other similar groupings.

The grouping information can include at least a first group associated with each guardian user contact device and at least a second group associated with each employee user contact device, a guardian priority order for contacting each guardian user contact device within the group and an employee priority order for contacting each employee user contact device within the group.

The grouping information further includes a priority order for contacting each guardian and employee within the group The priority order directs the administrator interface as to the order in which the interface should contact the individual contact devices.

The priority order provides the benefit of ensuring that the most critical guardians and employees receive the message first in case time is not available to contact all the users. The priority order also provides the benefit that all guardians and employees get contacted with equal priority, rather than a discriminating message delivery priority. The priority order guarantees that all users get contacted to on a preferred device first.

As shown in FIG. 1 and FIG. 3, the response data (52) in the dynamic information database (38) is directed towards information based upon whether the contact device and, in turn, the guardian, employee, and/or student received the message. The response data (52) includes guardian response information (64) that indicates whether the guardian has received the message (6*a* and 6*b*). The response data (52) includes employee response information (66) that indicates whether the employee has received the message (6*a* and 6*b*). The response data (52) also includes student response information (70) that indicates whether the student has received the message (6*a* and 6*b*).

The response information (64 and 66) is gathered by the dynamic information database (38). The response data (64 and 66) further includes "error-in-response" information (68) that indicates the contact data (40, 45, and 62) is insufficient and can not be delivered properly. The error in response information (68) can also indicate that an e-mail address or phone number is simply invalid, which is also shown in FIG. 1 and FIG. 3.

The guardian data, employee data, and student data are a member selected from the group: a user name, a user address, a user phone number, a user device address, a social security number, an account code, a employee identification number, a student identification number, and combinations thereof.

Student data (62) can include student priority information that indicates a contact order for the student contact device and can include a student identification number which may correspond to a bar code, a radio frequency identification device or RFID tag, a scannable badge, a smart card, a biometric file, and combinations thereof.

Other guardian, employee, and student data can include but is not limited to: student address, parent address, employee address, grade level, employee position, phone extensions, student name, employee name, parent name, latitude, longitude, geocode, birth date, social security number, employee id, student id, school level, school name, school phone number, school address, and combinations of.

Returning to FIG. 1, an administrator initiates distribution of the message using the guardian data, employee data, and student data, wherein the message is transmitted through at least two industry standard protocols (48 and 50) simultaneously, and the message is received by at least one guardian contact device, at least one employee contact device, and/or at least one student contact device, and wherein at least one guardian contact device, at least one employee contact device, and/or at least one student contact device transmits a response through the industry standard protocols to the dynamic information database.

The administrator (26) can initiate a distribution of one or more messages (6a and 6b). The system can be initiated automatically. Fire alarms when set off, can automatically alert the system, and then the system can automatically advise a user. Another example is that the system can tie to a tracking system, so that if a child misses certain periods of school, the system can advise the guardian that the student is missing those classes.

Returning to FIG. 3, the system uses the information in the dynamic information database (38) namely the contact data (40, 45, and 62), priority information (44a, 44b, and 44c), which includes priority order, to determine who to contact and in what order.

The message as noted above transmitted through at least two industry standard protocols simultaneously. By transmitting the message through numerous protocols, the system provides redundancy in order to ensure the message is relayed to the guardians, employees, and student. An example of an industry standard protocol is a Megaco/H.248 Protocol, Simple Message Transfer Protocol (SMTP), a Short Message Service Protocol (SMS), a Multimedia Message Service Protocol (MMS), an Enhanced Message Service Protocol (EMS), a Media Gateway Control Protocol (MGCP), a SIP Protocol, a H.323 Protocol, an ISDN Protocol, a PSTN Protocol, or the like, or combinations of.

The priority information and order directs the administrator interface (24) to contact a first group of contact devices, for this example, the guardian contact device (28a) indicated as a first contact. After all of the contact devices in the first contact have received the message, the priority order directs the administrator interface (24) to contact a second group of contact devices, for this example, the employee contact device (28b) indicated as a second contact. Then, the administrator interface continues to relay messages to contact devices based on the priority order until all contact devices are reached and a response is provided from the contact devices. The priority order of the user devices is selected by the user.

Once the message is received by a contact device, the contact device (28a, 28b, 28c, and 28d) transmits a response back through the industry standard protocols (48 and 50) to the dynamic information database (38). The dynamic information database (38) stores the responses and the unique address of each user contact device. The response from the guardian contact device, employee contact device, and student contact device can be an audio file or a dual-tone multi-frequency "DTMF" tone, also known as a touch tone. The "DTMF" tone can be used for telephone signaling over the line in the voice frequency band to the call switching center.

Figure 4:
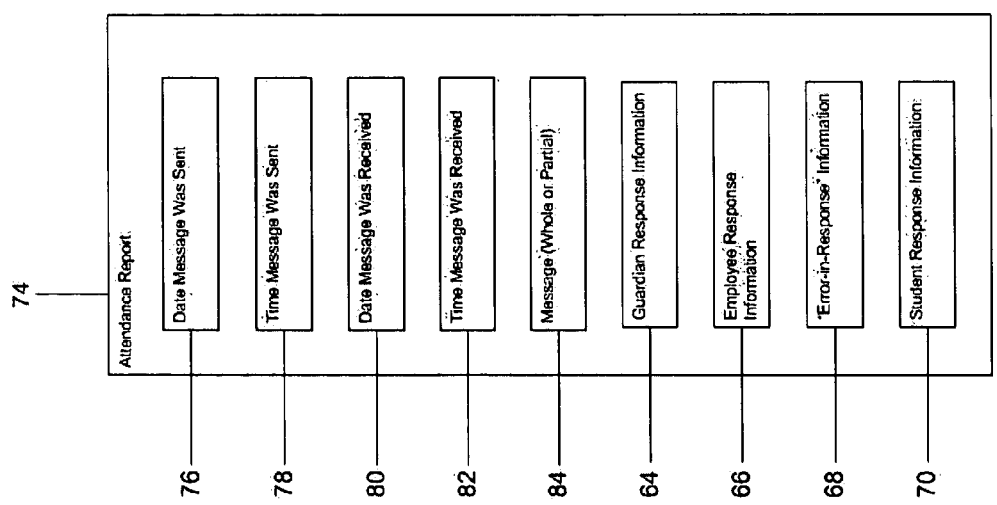
FIG. 4 depicts a representation of an embodiment of a attendant report associated with a digital notification and response system.

In an alternative embodiment, the system can include reporting information in order to generate reports based upon information in the dynamic information database (38). The report can be an attendance report (74) as shown in FIG. 4. The reports can be generated by the administrator, the user, a group, or combinations thereof. The reports can include a date the message was sent (76), a time the message was sent (78), a date the message was received (80), a time the message was received (82), content of the message (84), whether whole or partial, a recipient of the message, recipient information related to the recipient of the message, and combinations thereof, which can be in the form of guardian response information (64), employee response information (66), and/or student response information (70), and provide an "error-in-response" information (68) to make sure all contact devices are working properly, or if the guardians, employees, and students must be contacted for additional information or working numbers. Other examples include the name of the person who received the message, a copy of the voice mail, a time when an e-mail was accessed, the time when a fax is printed and so on. The administrator can create custom designed reports, or standard reports can be generated from the dynamic information database for use by the administrator.

Reporting includes generating custom designed attendance reports created by the administrator, or generating standard reports generated from the dynamic information database using preconceived templates or combinations thereof.

The reports are contemplated to have a date the message was sent, a time the message was sent, a date the message was received, a time the message was received, content of the message, a recipient of the message, recipient information for the message, and combinations thereof.

In an alternative embodiment, the system can include a language converter to translate a text message to second language. The language converter is often referred to as a translator (54) as shown in FIG. 1. For example, the language converter can convert the message from English to a second language, such as Korean, Chinese, Vietnamese, French, English, Spanish, Italian, Norwegian, Swedish, German, Japanese, Russian, or Portuguese. The language converter is beneficial because not all users speak the same language, thereby causing a breakdown in the communication between groups of people due to language. The system allows the user to designate a specific language in which to receive the message. The chosen language is stored in the dynamic information database (38) as the user selected language (90a, 90b, and 90c), as shown in FIG. 3.

In an alternative embodiment, the system can include a text-to-sound file converter. The text-to-sound file converter can be used to translate a message from text to a sound file. The text-to-sound file converter is beneficial because the message is consistent using the same voice, with the same accent, same dynamic, same delivery speed. The text-to-sound file converter enables individuals with disabilities, namely visual impairment, to also receive the consistent message.

The claimed notification and response system provides quick delivery speed. The system can send alert messages to thousands of recipients in about thirty seconds with the click of a single mouse. In the event of computer failure, the network 22, as shown in FIG. 1, can be contacted toll free from any phone to get the message directly from an administrator interface. Every second counts when a student is drowning in the school swimming pool or some other crisis is occurring. This notification system alerts people who need to respond right away.

The claimed notification and response system provides format and message flexibility. The response system can reach numerous recipients on numerous types of contact devices virtually at the same time. For example, the system can contact telephones, cell phones, digital pagers, fax machines, wireless PDA devices, email systems, computer system tray icons, Amber alert systems, and LED signs. Voice and text can be delivered in numerous languages as specified by recipients. The system can enable parents of students who do not speak English well to be notified and act on an emergency message enabling immigrant families to act quickly as well as native English speaking families. Since the claimed system solves the language barrier problems, the system is vital to states that have large non-English speaking family populations, such as Texas, California, and Florida.

The embodied system provides message consistency. The notification system can be used to deliver exactly the same message to all recipients to prevent confusion and rumor control. Message inconsistency can cause people to go to the wrong location or follow conflicting directions in the case of a bomb threat, terrorist action, or other acts of extreme violence.

The system can be used to prevent bombing, bomb threats, and school shootings. For example, the locker bomb explosion in January 1999 in a high school in Kansas City sent eleven students to the hospital. If a silent alarm or alert system had been triggered to all the teachers when the bomb threat was known, a quick evacuation of the school could have occurred in order to prevent the injuries or deaths. Had an embodiment of the system and method been used, the system could have quickly notified users, wherein the parent priority order directs transmission of the message first to all guardian contact devices indicated as a first contact, then to all guardian contact devices indicated as a second contact, then continues contacting guardian contact devices based on the priority order until all guardian contact devices are contacted insuring everyone has been notified. Similarly, an employee priority order would have directed transmission of the message first to all employee contact devices indicated as a first contact, then second to all employee contact devices indicated as a second contact, then continues contacting employee contact devices based on the priority order until all employee contact devices are contacted. Additionally, a student priority order would have directs transmission of the message first to all student contact devices indicated as a first contact, then second to all student contact devices indicated as a second contact, then continues contacting student contact devices based on the priority order until all student contact devices are contacted.

In another example, a Maryland School district experienced more than one hundred and fifty bomb threats with fifty-five associated arrests in a single school term of nine months. If the claimed notification system was in place, the cost of notifying the guardians, employees, and students of the school system would have been less than the cost incurred in notifying guardians, employees, and students. Additional embodiments can include the notifying school faculty and employees, safety personal, such as EMS, police departments, and fire departments, and additional authorities. The messages could have been delivered quickly and simultaneously to aid in evacuating schools or warning students from coming to school. The quick messages could also have led to quicker arrests since more people would be aware of the problem. The system would have also provided a consistent message in order to quell rumors and to provide updates.

The claimed notification and response system provides receipt verification. The notification and response system automatically verifies message receipt and saves data for a variety of reports. Receipt verification of an emergency situation helps saves lives by providing accountability to the schools. Schools can show that the required parties were sent the message and that the message was received by those individuals.

The embodied system provides a system that provides significant cost savings to institutions. The system uses devices that users, guardians, employees, and students already have in order to transmit and receive messages. The system does not require additional hardware. Since the system is more cost effective, more schools and school systems can afford the notification system. Schools in the poorest school districts in the country with massive drug abuse and safety issues can afford to use this system to stop harm and save lives.

The claimed notification and response system is reliable. The system provides digital, broadband, fail-safe, multi-format, rapid verification and response communication connected to the world's most reliable internet communications network. This reliability saves lives because police, fire, security, and medical professionals can be notified at any time upon indications of an alarm. Reliable messages lead to a fast response and saved lives.

An additional embodiment can be for a digital notification and response system having an administrator interface for transmitting a message from an administrator to at least one guardian contact device, and at least one employee contact device, and/or at least one student contact device, wherein each guardian contact device corresponds to a guardian in an institution, wherein each employee contact device corresponds to an employee of the institution, and wherein each student contact device corresponds to a student in a institution.

An embodiment contemplates a reporting feature for providing customized reports for users and administrators, or standardized reports for users or groups of users and administrators.

Lastly an embodiment contemplates that a message is transmitted automatically to the users when all student funds fall below preset limits.

The embodiments have been described in detail with particular reference to certain embodiments, thereof, but it will be understood that variations and modifications can be effected within the scope of the embodiments, especially to those skilled in the art.

What is claimed is:

1. A digital notification and response system, comprising:
   a. an attendance database for at least one person enrolled in an institution, consisting of a member of the group: real time absence information, real time presence information, or combinations thereof;
   b. a processor containing computer instructions connected to a network, wherein the computer instructions comprising:
      i. an administrator interface in communication with the processor for transmitting a message from an administrator to at least a member of the group consisting of: at least one guardian contact device, at least one employee contact device, or combinations thereof, wherein each guardian contact device corresponds to a guardian of at least one person enrolled in the institution, and wherein each contact device corresponds to at least one person enrolled in the institution, and wherein each employee contact device corresponds to an employee; and
      ii. attendance computer instructions in communication with the processor for tracking the at least one person enrolled in the institution, wherein the attendance computer instructions instruct the processor to transmit a message to a member of the group: a guardian contact device, employee contact device, or combinations thereof, using the real time absence information, or real time presence information on the person enrolled in the institution;
   c. a dynamic information database in communication with the processor, wherein the dynamic information database comprises:
      iii. guardian data comprising:
         1. guardian user contact device information; and
         2. guardian priority information indicating a contact order for the guardian contact device;
      iv. employee data comprising:

1. employee contact device information; and
2. employee priority information that indicates a contact order for the employee contact device;

wherein the administrator initiates distribution of the message using the guardian data, employee data, or both, and wherein the message is transmitted through at least two industry standard protocol simultaneously, and the message is received by a member of the group consisting of: at least one guardian contact device, at least one employee contact device, or combinations thereof, and wherein at least one contact device transmits a response data through the industry standard protocol to the dynamic information database.

2. The system of claim 1, wherein the administrator interface further comprises a translator.

3. The system of claim 1, wherein the administrator interface further comprises a "call me" feature.

4. The system of claim 1, wherein the institution is a school.

5. The system of claim 4, further comprising at least one student contact device corresponding to a student in a school, and the guardian contact device corresponds to at least one student in the school, and student data comprises:
   a. a student user contact device information; and
   b. student priority information indicating a contact order for the student contact device.

6. The system of claim 1, wherein the processor receives response data from the contact devices comprising: guardian response information indicating which guardian contact devices have received the message; employee response information indicating which employee contact devices have received the message; error in response information that indicates when insufficient contact device information exists for the guardian contact device, the employee contact device, or combinations thereof.

7. The system of claim 5, wherein the processor receives response data from the student contact device comprising: student response information indicating which student contact devices have received the message.

8. The system of claim 1, wherein the response from the guardian contact device, or employee contact device is an audio file or a dual-tone multi-frequency "DTMF" tone.

9. The system of claim 1, wherein the response from the student contact device is an audio file or a DTMF tone.

10. The system of claim 1, wherein the least one person enrolled in an institution has a personal identification code "PIC".

11. The system of claim 10, wherein the PIC corresponds to a bar code, a radio frequency identification device "RFID" tag, a scannable badge, a smart card, security token, a biometric file, and combinations thereof.

12. The system of claim 1, further comprising an attendance report, wherein the attendance report comprises a date the message was sent, a time the message was sent, a date the message was received, a time the message was received, at least a portion of the message, the guardian or employee that received the message, receipt that the message was received, and combinations thereof.

13. The system of claim 6, further comprising an attendance report, wherein the attendance report comprises a date the message was sent, a time the message was sent, a date the message was received, a time the message was received, at least a portion of the message, the guardian or employee that received the message, receipt that the message was received, response information that is selected from the group: employee response information, guardian response information, error in response information, or combinations for the message, and combinations thereof.

14. The system of claim 1, wherein the network is a local area network web interface, a wide area network web interface, virtual private network interface, asynchronous transfer mode interface, synchronous optical network interface a call center interface, a voice mail, or combinations thereof.

15. The system of claim 1, wherein the administrator is a person, a computer, another digital notification and response system, an analog notification system, or combinations thereof.

16. The system of claim 1, wherein the message comprises a designation selected from the group: low priority, general priority, significant priority, high priority, and severe priority.

17. The system of claim 16, wherein the designation comprises a color associated with the priority.

18. The system of claim 1, wherein the message is a prewritten message stored in the dynamic information database for subsequent use by the administrator.

19. The system of claim 1, wherein the dynamic information database is an SQL™ database, MySQL™ database; other industry standard databases, an Oracle™ database, or combinations thereof.

20. The system of claim 1, wherein the industry standard protocol is selected from the group: a Megaco/H.248 protocol, Simple Message Transfer Protocol (SMTP) protocol, a Short Message Service (SMS) protocol, Multimedia Message Service (MMS) protocol, a Enhanced Message Service (EMS) protocol, a Media gateway Control Protocol (MGCP), a SIP protocol, a H.323 protocol, an ISDN protocol, a PSTN protocol, and combinations thereof.

21. The system of claim 1, wherein the contact data is a member selected from the group: a user name, a user address, a user phone number, a user device address, a social security number, an account code, a employee identification number, and combinations thereof.

22. The system of claim 1, wherein the priority information of the contact devices are selected by the guardian or employee.

23. The system of claim 22, wherein the priority information directs transmission of the message first to all contact devices indicated as a first contact, then to all contact devices indicated as a second contact, then continues contacting contact devices based on the priority information until all contact devices are contacted.

24. The system of claim 5, wherein the student priority information directs transmission of the message first to all student contact devices indicated as a first contact, then second to all student contact devices indicated as a second contact, then continues contacting student contact devices based on the priority order until all student contact devices are contacted.

25. The system of claim 1, wherein the contact devices are handheld wireless device from the group: a wireless phone, a land phone, an email address; a fax machine, a pager, a digital display, a light emitting diode "LED" display, or combinations thereof.

* * * * *